(12) United States Patent
Kannan et al.

(10) Patent No.: US 8,949,830 B2
(45) Date of Patent: Feb. 3, 2015

(54) EMULATING A DATA CENTER NETWORK ON A SINGLE PHYSICAL HOST WITH SUPPORT FOR VIRTUAL MACHINE MOBILITY

(75) Inventors: Kalapriya Kannan, Bangalore (IN); Vijay Mann, Haryana (IN); Anil Kumar Vishnoi, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/433,884

(22) Filed: Mar. 29, 2012

(65) Prior Publication Data

US 2013/0263118 A1    Oct. 3, 2013

(51) Int. Cl.
*G06F 9/455*    (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 7,643,468 B1 | 1/2010 | Arregoces et al. | |
| 8,027,354 B1 | 9/2011 | Portolani et al. | |
| 8,621,461 B1 * | 12/2013 | Chandrachari et al. | 718/1 |
| 2008/0310422 A1 | 12/2008 | Booth et al. | |
| 2010/0095297 A1 * | 4/2010 | Sethi et al. | 718/1 |
| 2010/0257263 A1 | 10/2010 | Casado et al. | |
| 2010/0306408 A1 | 12/2010 | Greenberg et al. | |
| 2011/0019531 A1 * | 1/2011 | Kim et al. | 370/216 |
| 2011/0138384 A1 | 6/2011 | Bozek et al. | |
| 2011/0219372 A1 * | 9/2011 | Agrawal et al. | 718/1 |
| 2012/0311568 A1 * | 12/2012 | Jansen | 718/1 |

FOREIGN PATENT DOCUMENTS

WO    2011093882    8/2011

OTHER PUBLICATIONS

Greenberg, A., et al., "VL2: A Scalable and Flexible Data Center Network", Proceedings of the ACM SIGCOMM Conference on Data Communication (SIGCOMM '09), Aug. 17-21, 2009, pp. 51-62, Barcelona, Spain 1-1.
Guo, C., et al., "SecondNet: A Data Center Network Virtualization Architecture with Bandwidth Guarantees", ACM CoNEXT 2010, Nov. 30-Dec. 3, 2010, 12 pages, Philadelphia, Pennsylvania, USA.
Mysore, R. N., et al., "Portland: A Scalable Fault-Tolerant Layer 2 Data Center Network Fabric", Proceedings of the ACM SIGCOMM Conference on Data Communication (SIGCOMM '09), Aug. 17-21, 2009, pp. 39-50, Barcelona, Spain.

* cited by examiner

*Primary Examiner* — Emerson Puente
*Assistant Examiner* — Sisley Kim
(74) *Attorney, Agent, or Firm* — Ference & Associates LLC (57) ABSTRACT

Methods and arrangements for emulating a data center network. A first end host and a second end host are provided. A base hypervisor is associated with each of the first and second end hosts, and the first and second end hosts are interconnected. A virtual hypervisor is associated with at least one virtual machine running on at least one of the base hypervisors, and virtual hypervisors are interconnected within one of the first and second end hosts. A virtual machine is nested within the virtual hypervisor, and the virtual machine is migrated from one virtual hypervisor to a destination virtual hypervisor to further be nested within the destination virtual hypervisor.

25 Claims, 4 Drawing Sheets

EMULATING A DATA CENTER NETWORK ON A SINGLE PHYSICAL HOST WITH SUPPORT FOR VIRTUAL MACHINE MOBILITY

BACKGROUND

Data center network research often demands a datacenter environment with a number of hosts, with virtualization support and switches to connect these hosts. A simple minimal fat tree topology, for instance, may well require 7 switches and at least 4 physical hosts.

Desirably, a simulation or emulation methodology should support at least the following basic requirements: support for end host virtualization and migration of virtual machines; full control over the network switches (software and layer-2, layer-3 configuration); and full control over the host software and hardware resources. Conventional simulation and emulation tools do not support all these requirements. In some cases, they may use network namespace and virtual ethernet pairs (veth) without supporting host virtualization and VM (virtual machine) migration. In other cases, host virtualization and VM migration are still not supported, and any developed code cannot realistically be deployed on a real switch. Limited control over host software and hardware resources also emerges as a problem.

If an attempt is made to construct a network of virtual machines with unsophisticated connections and interfaces, too much "weight" might emerge as a problem, and scalability might be limited to merely a handful of hosts and switches.

BRIEF SUMMARY

In summary, one aspect of the invention provides a method comprising providing a first end host and a second end host; associating a base hypervisor with each of the first and second end hosts; interconnecting the first and second end hosts; associating a virtual hypervisor with at least one virtual machine running on at least one of the base hypervisors; interconnecting virtual hypervisors within one of the first and second end hosts; nesting a virtual machine within a virtual hypervisor; and migrating the virtual machine from one virtual hypervisor to a destination virtual hypervisor to further be nested within the destination virtual hypervisor.

Another aspect of the invention provides an apparatus comprising at least one processor; and a computer readable storage medium having computer readable program code embodied therewith and executable by the at least one processor, the computer readable program code comprising: computer readable program code configured to provide a first end host and a second end host; computer readable program code configured to associate a base hypervisor with each of the first and second end hosts; computer readable program code configured to interconnect the first and second end hosts; computer readable program code configured to associate a virtual hypervisor with at least one virtual machine running on at least one of the base hypervisors; computer readable program code configured to interconnect virtual hypervisors within one of the first and second end hosts; computer readable program code configured to nest a virtual machine within a virtual hypervisor; and computer readable program code configured to migrate the virtual machine from one virtual hypervisor to a destination virtual hypervisor to further be nested within the destination virtual hypervisor.

An additional aspect of the invention provides a computer program product comprising a computer readable storage medium having computer readable program code embodied therewith, the computer readable program code comprising: computer readable program code configured to provide a first end host and a second end host; computer readable program code configured to associate a base hypervisor with each of the first and second end hosts; computer readable program code configured to interconnect the first and second end hosts; computer readable program code configured to associate a virtual hypervisor with at least one virtual machine running on at least one of the base hypervisors; computer readable program code configured to interconnect virtual hypervisors within one of the first and second end hosts; computer readable program code configured to nest a virtual machine within a virtual hypervisor; and computer readable program code configured to migrate the virtual machine from one virtual hypervisor to a destination virtual hypervisor to further be nested within the destination virtual hypervisor.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
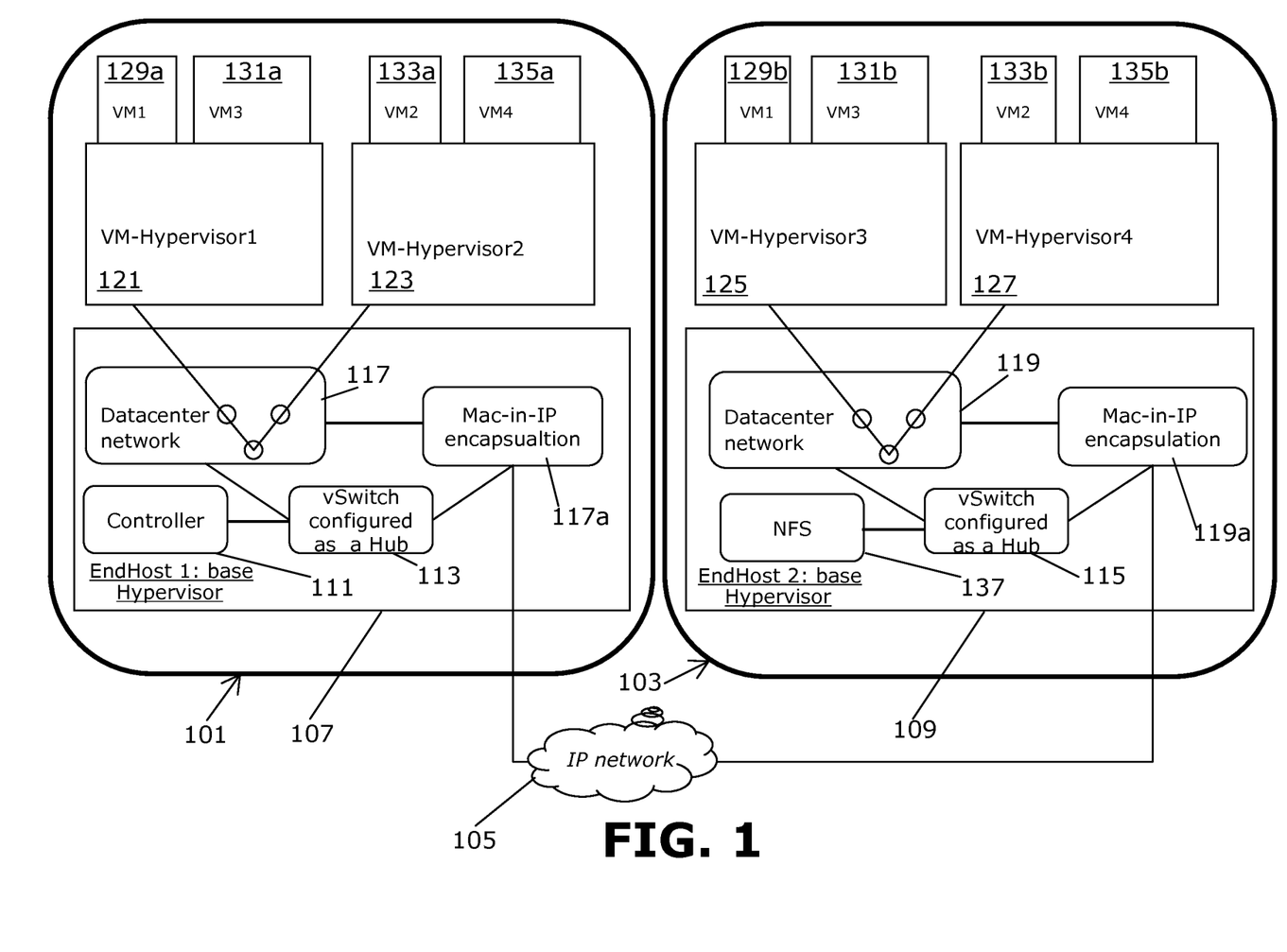
FIG. 1 schematically illustrates a virtual data center.
Figure 2:
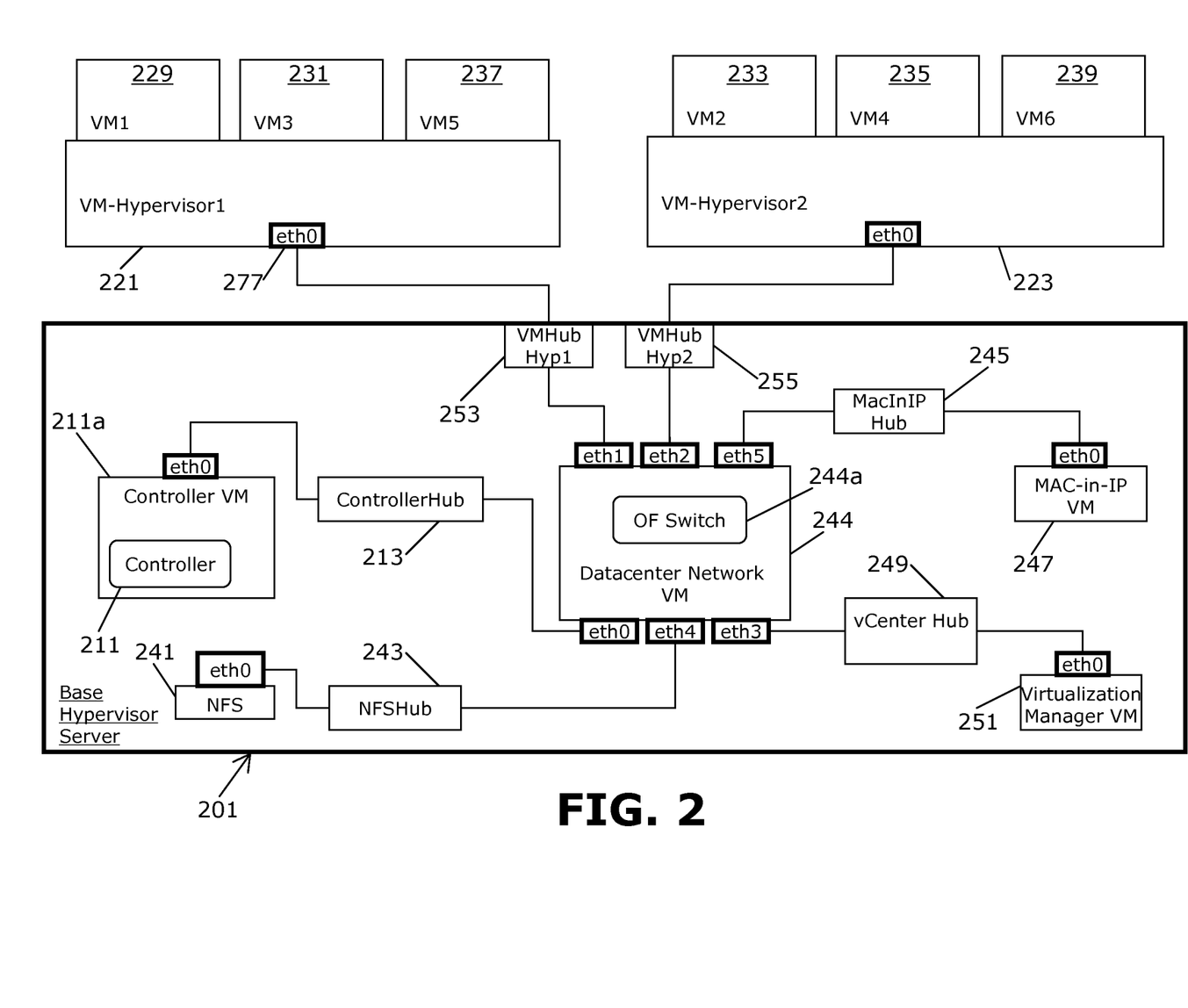
FIG. 2 schematically illustrates a virtual data center network.

The disclosure now turns to FIGS. 1 and 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

To facilitate easier reference, in advancing from FIG. 1 to and through FIG. 2, a reference numeral is advanced by a multiple of 100 in indicating a substantially similar or analogous component or element with respect to at least one component or element found in FIG. 1.

In accordance with at least one embodiment of the invention, there is broadly contemplated herein the use of a mix of system virtualization, which can be embodied as nested virtualization, and OS-level (operating system level) virtualization, which can involve network namespaces and virtual ethernet pairs, to support virtual machine mobility and emulation of a data center network with large number of switches and hosts within a single physical host.

In accordance with at least one embodiment of the invention, nested virtualization, software defined networking, and OS virtualization features such as network namespaces and virtual Ethernet pairs are leveraged to create a "miniature" datacenter within a physical machine with full support for: end host virtualization and migration of virtual machines; full control over network switches (e.g., software and layer-3, layer-2 configuration); and full control over the host software and hardware resources.

In accordance with at least one embodiment of the invention, nested virtualization advantageously lends itself to the emulation of hosts with support for virtual machine migration within a physical machine. A data center network using network namespaces and virtual Ethernet (veth) pairs advantageously lends itself to the creation of a large number of software switches and hosts without virtualization support.

In accordance with at least one embodiment of the invention, each host is a process in its own network namespace with its own virtual Ethernet interfaces. Veth pairs may be attached to virtual switches as a Linux bridge, or a software Openflow switch. Hosts with virtualization support (that is, VMs that run hypervisor software, or "virtual hypervisors") are connected directly into the data center network using virtual switch connectivity provided by a base hypervisor. A network controller running in a virtual machine controls the software switches in data center network. Mac-in-IP encapsulation can provide connectivity between multiple physical machines to enable seamless integration of multiple physical machines into the same data center emulation system.

FIG. 1 schematically illustrates, in accordance with at least one embodiment of the invention, a virtual data center using 2 physical machines emulating 4 hosts with virtualization support. The effect is to create 8 virtual machines (VM's), hundreds of software switches and hundreds of hosts without virtualization support. Indicated at 101 and 103, respectively, are first and second end hosts in communication with an IP network 105. Each of these end hosts includes a base hypervisor (107 and 109, respectively), on top of which several virtual machines (VM) are created (111, 117/119, 117a/119a, 121/123 and 125/127). At least one virtual machine in one of the end hosts will run a network controller (111), which is in communication with a vSwitch or software switch configured as a hub (113 and 115, respectively). Each hub 113/115 is in communication with a VM that emulates a datacenter network (117 and 119, respectively) and a VM that runs MAC-in-IP encapsulation software (117a and 119a, respectively), which are also in communication with each other. The MAC-in-IP encapsulation software 117a/119a provides communication with IP network 105. At least one virtual machine will also run a shared NFS (network file system) service for storing VM images (137) and will be connected to the data center network VM in one of the end hosts.

In accordance with the present illustrative example, in accordance with at least one embodiment of the invention, each base hypervisor 107/109 hosts two virtual machines (121/123 and 125/127, respectively) that run hypervisor software (using a technique referred to as "nested virtualization"). The "VM-Hypervisor" label on each of 121/123 and 125/127 indicates their functioning as virtual hypervisors.

The various VMs that run the hypervisor software (or the virtual hypervisors—VMs 121/123 and 125/127) represent multiple virtual hosts. Virtual hypervisors or virtual hosts can be connected to each other through an OpenFlow software switch or Mininet (that emulates multiple OpenFlow software switches. Shared storage for these virtual hosts (for storing VM images) can be provided by the shared NFS service also running inside a VM (137) and be connected to the data center network 117. Direct wire connectivity between these various VMs (OpenFlow or Mininet [data center network] VM, Controller VM, NFS VM, and Virtual Hypervisor VMs) can be achieved through various vSwitches (e.g., 113/115) on a base hypervisor (107/109).

Nested within these virtual hypervisors 121/123 and 125/127 are additional VM's. As shown, virtual hypervisor VM 121 incorporates VM's 129a and 131a, while VM 123 incorporates VM's 133a and 135a. These same four nested VM's (129a/131a/133a/135a) are incorporated within VM's 125 and 127, as shown. This is facilitated with the connection to IP network 105 and by way of switching arrangements such as those discussed herein, wherein any of the nested VM's (129a/131a/133a/135a or 129b/131b/133b/135b) can easily be migrated from one virtual hypervisor to another virtual hypervisor either within the first end host 101 (e.g., from virtual hypervisor VM 121 to virtual hypervisor VM 123 or vice versa) or within the second end host 103 (e.g., from virtual hypervisor VM 125 to virtual hypervisor VM 127 or vice versa), or from one end host (101 or 103) to the other (e.g., from virtual hypervisor VM 121 to virtual hypervisors VM 125/VM 127, or vice versa, or from virtual hypervisor VM 123 to virtual hypervisors VM 125/VM127, or vice versa).

FIG. 2 schematically illustrates, in accordance with at least one embodiment of the invention, a virtual data center network with 2 hosts, 6 VMs and 1 switch. This figure can be understood as "zooming in" on one end host, in this case an end host 201. FIG. 2 also lends an appreciation to the capability of migrating VM's within a single end host.

Accordingly, in accordance with at least one embodiment of the invention as shown in FIG. 2, two virtual machines (in the form of virtual hypervisors) are hosted (221, 223), and each incorporates three nested VM's, respectively. Thus, virtual hypervisor 221 hosts VM's 229, 231 and 237, while virtual hypervisor 223 hosts VM's 233, 235 and 239. The controller VM (211a) runs a network controller software such as NOX or FloodLight (OpenFlow Controller) (211). NFS VM (241) runs a shared NFS service for storing VM images. Data center network VM (244) runs OpenFlow software switch (244a) or Mininet (that emulates multiple OpenFlow software switches).

In accordance with at least one embodiment of the invention, Mininet uses process-based virtualization and network namespaces to rapidly prototype OpenFlow networks. Simulated hosts (as well as OpenFlow software switches) are created as processes in separate network namespaces. Connectivity between hosts and switches, and between switches is obtained using virtual interfaces and each host, switch and the controller has a virtual interface (half of a "veth" pair).

In accordance with at least one embodiment of the invention, real hosts (in this case, the virtual hypervisor hosts) are connected to interfaces of the datacenter network VM (running OpenFlow Software switch or Mininet) such that they are connected to the data center network created inside the VM. For some hypervisors (e.g. VMWare ESX hypervisor), a virtualization manager (vCenter for VMWare) may also be required. This virtualization manager will run in its own VM (251) and will be connected to the data center network VM. Direct wire connectivity between these various VMs (OpenFlow or Mininet (data center network) VM, Controller VM, NFS VM, and Virtual Hypervisor VMs) is achieved through various vSwitches configured as hubs (213,243,245,249,253, 255) on the base hypervisor that connect the corresponding network interfaces on each VM.

In recapitulation, it will be appreciated from the foregoing that there are broadly contemplated herein, in accordance with at least one embodiment of the invention, a system and method for emulating a data center network on a single physical host, wherein the data center network comprises multiple software network switches, created using network namespaces and virtual ethernet pairs, which can be connected to each other using any arbitrary topology and configured to support various layer-2 and layer-3 features. Also included are multiple end hosts which support virtualization and can host multiple virtual machines which can be migrated between different end hosts using nested virtualization, and ends hosts with virtualization support that are connected directly into a data center network using virtual switch connectivity.

There is further broadly contemplated herein, in accordance with at least one embodiment of the invention, the use of nested virtualization to create virtual machines that run hypervisor or virtual machine monitor software and represent end hosts which can host multiple virtual machines which can then be migrated to other similar end hosts.

Additionally, there is broadly contemplated herein, in accordance with at least one embodiment of the invention, the use of network namespaces and virtual Ethernet (veth) pairs to create a large number of software switches and hosts on a single virtual machine, wherein each host is a process in its own network namespace with its own virtual Ethernet interfaces, and veth pairs may be attached to virtual switches such as a Linux bridge or a software Openflow switch.

Moreover, there is broadly contemplated herein, in accordance with at least one embodiment of the invention, the interconnection of multiple physical machines via Mac-in-IP encapsulation to enable seamless integration of multiple physical machines into the same data center emulation system.

Figure 3:
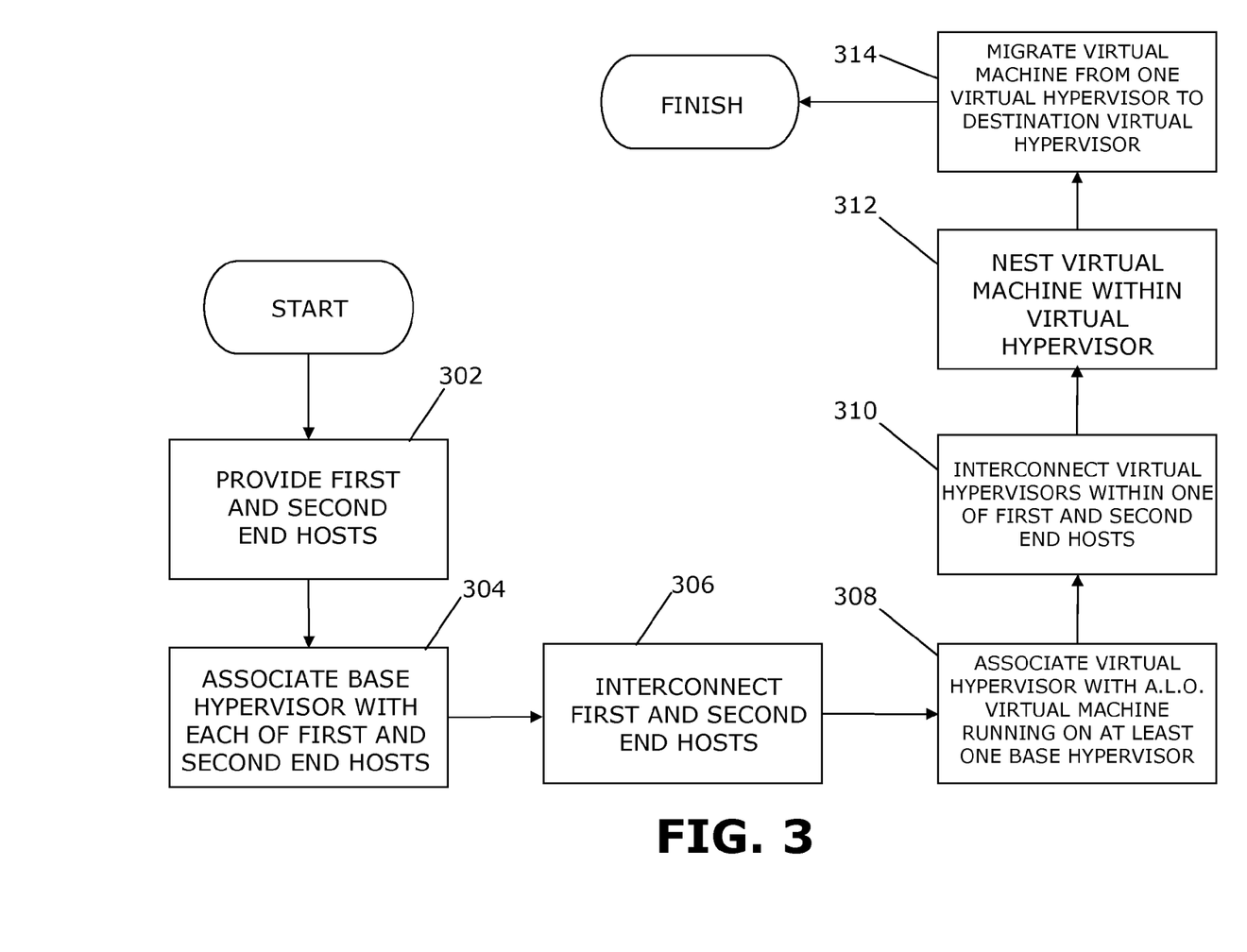
FIG. 3 sets forth a process more generally for emulating a data center network.

FIG. 3 sets forth a process more generally for emulating a data center network, in accordance with at least one embodiment of the invention. It should be appreciated that a process such as that broadly illustrated in FIG. 3 can be carried out on essentially any suitable computer system or set of computer systems, which may, by way of an illustrative and on-restrictive example, include a system such as that indicated at 12' in FIG. 4. In accordance with an example embodiment, most if not all of the process steps discussed with respect to FIG. 3 can be performed by way a processing unit or units and system memory such as those indicated, respectively, at 16' and 28' in FIG. 4.

As shown in FIG. 3, a first end host and a second end host are provided (302). A base hypervisor is associated with each of the first and second end hosts (304), and the first and second end hosts are interconnected (306). A virtual hypervisor is associated with at least one virtual machine running on at least one of the base hypervisors (308), and virtual hypervisors within one of the first and second end hosts are interconnected (310). A virtual machine is nested within the virtual hypervisor (312), and the virtual machine is migrated from one virtual hypervisor to a destination virtual hypervisor to further be nested within the destination virtual hypervisor (314).

Figure 4:
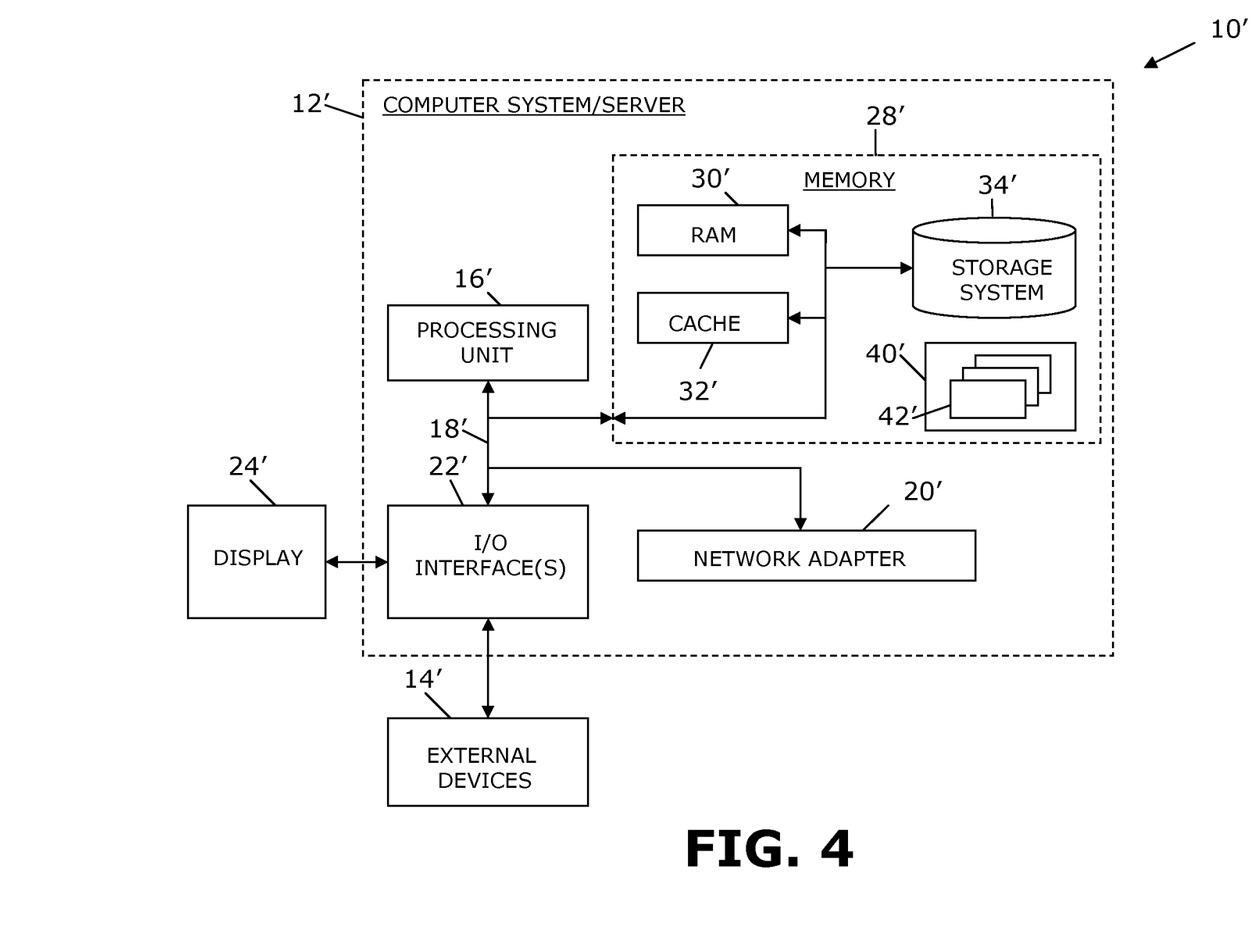
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   providing a first end host and a second end host;
   associating a first base hypervisor with the first end host and a second base hypervisor with the second end host;
   interconnecting the first and second end hosts;
   associating at least one virtual hypervisor with each of the first and second base hypervisors;
   nesting a virtual machine within a virtual hypervisor;
   migrating the virtual machine to a destination virtual hypervisor;
   additionally nesting the migrated virtual machine within the destination virtual hypervisor;
   wherein the destination virtual hypervisor is associated with either of: the first base hypervisor and the second base hypervisor;
   wherein at least one virtual machine in one of the first and second end hosts runs a network controller which is in communication with at least one software switch;
   wherein at least one of the first and second end hosts emulates a data center network virtual machine which is in communication with the at least one software switch; and
   wherein one of the first and second end hosts comprises a virtual machine which runs a shared network file system service, comprising a virtual machine image, which is in communication with the data center network.

2. The method according to claim 1, wherein:
   said associating comprises associating a first virtual hypervisor and a second virtual hypervisor with one of the first and second end base hypervisors, using nested virtualization;
   said method comprises interconnecting the first and second virtual hypervisors.

3. The method according to claim 2, wherein:
   said nesting comprises nesting a first virtual machine within the first virtual hypervisor; and
   said method further comprises nesting a second virtual machine within the second virtual hypervisor.

4. The method according to claim 3, further comprising migrating the second virtual machine from the second virtual hypervisor to another virtual hypervisor.

5. The method according to claim 1, further comprising:
   nesting a second virtual machine within a virtual hypervisor; and
   migrating the second virtual machine from one virtual hypervisor to another virtual hypervisor.

6. The method according to claim 2, further comprising:
   emulating a data center network within the first end host; and
   said interconnecting of the first and second virtual hypervisors comprising using at least one configurable network element taken from the group consisting of: software switches and the data center network.

7. The method according to claim 6, further comprising emulating multiple network switches and hosts within the data center network via employing network namespaces and virtual ethernet pairs.

8. The method according to claim 1, wherein said interconnecting comprises:
   incorporating Mac-in-IP encapsulation at each of the first and second end hosts; and
   employing the Mac-in-IP encapsulation of the first and second end hosts to communicatively connect the first and second end hosts at layer-2.

9. The method according to claim 1, wherein said interconnecting comprises interconnecting the first and second end hosts at layer-2.

10. The method according to claim 2, wherein said interconnecting of the first and second virtual hypervisors comprises employing at least one member taken from the group consisting of: software switches; a data center network emulated through network namespaces and virtual ethernet pairs.

11. The method according to claim 1, wherein said migrating comprises migrating the virtual machine from one virtual hypervisor to another virtual hypervisor within one of the first or second end hosts.

12. The method according to claim 1, wherein said migrating comprises migrating the virtual machine from one virtual hypervisor to another virtual hypervisor from the first end host to the second end host.

13. An apparatus comprising:
at least one processor; and
a computer readable storage medium having computer readable program code embodied therewith and executable by the at least one processor, the computer readable program code comprising:
computer readable program code configured to provide a first end host and a second end host;
computer readable program code configured to associate a first base hypervisor with the first end host and a second base hypervisor with the second end host;
computer readable program code configured to interconnect the first and second end hosts;
computer readable program code configured to associate at least one virtual hypervisor with each of the first and second base hypervisors;
computer readable program code configured to nest a virtual machine within a virtual hypervisor;
computer readable program code configured to migrate the virtual machine to a destination virtual hypervisor;
computer readable program code configured to additionally nest the migrated virtual machine within the destination virtual hypervisor;
wherein the destination virtual hypervisor is associated with either of: the first base hypervisor and the second base hypervisor;
wherein at least one virtual machine in one of the first and second end hosts runs a network controller which is in communication with at least one software switch;
wherein at least one of the first and second end hosts emulates a data center network virtual machine which is in communication with the at least one software switch; and
wherein one of the first and second end hosts comprises a virtual machine which runs a shared network file system service, comprising a virtual machine image, which is in communication with the data center network.

14. A computer program product comprising:
a non-transitory computer readable storage medium having computer readable program code embodied therewith, the computer readable program code comprising:
computer readable program code configured to provide a first end host and a second end host;
computer readable program code configured to associate a first base hypervisor with the first end host and a second base hypervisor with the second end host;
computer readable program code configured to interconnect the first and second end hosts;
computer readable program code configured to associate at least one virtual hypervisor with each of the first and second base hypervisors;
computer readable program code configured to nest a virtual machine within a virtual hypervisor;
computer readable program code configured to migrate the virtual machine to a destination virtual hypervisor;
computer readable program code configured to additionally nest the migrated virtual machine within the destination virtual hypervisor;
wherein the destination virtual hypervisor is associated with either of: the first base hypervisor and the second base hypervisor;
wherein at least one virtual machine in one of the first and second end hosts runs a network controller which is in communication with at least one software switch;
wherein at least one of the first and second end hosts emulates a data center network virtual machine which is in communication with the at least one software switch; and
wherein one of the first and second end hosts comprises a virtual machine which runs a shared network file system service, comprising a virtual machine image, which is in communication with the data center network.

15. The computer program product according to claim 14, wherein said computer readable program code is configured to:
associate a first virtual hypervisor and a second virtual hypervisor with one of the first and second end base hypervisors, using nested virtualization; and
interconnect the first and second virtual hypervisors.

16. The computer program product according to claim 15, wherein:
to nest a virtual machine comprises nesting a first virtual machine within the first virtual hypervisor; and
said computer readable program code is further configured to nest a second virtual machine within the second virtual hypervisor.

17. The computer program product according to claim 16, wherein said computer readable program code is further configured to migrate the second virtual machine from the second virtual hypervisor to another virtual hypervisor.

18. The computer program product according to claim 15, wherein said computer readable program code is further configured to:
emulate a data center network within the first end host; and
interconnect the first and second virtual hypervisors via using at least one configurable network element taken from the group consisting of: software switches and the data center network.

19. The computer program product according to claim 18, wherein said computer readable program code is further configured to emulate multiple network switches and hosts within the data center network via employing network namespaces and virtual ethernet pairs.

20. The computer program product according to claim 14, wherein said computer readable program code is configured to interconnect the first and second end hosts via:
interconnecting Mac-in-IP encapsulation at each of the first and second end hosts; and
employing the Mac-in-IP encapsulation of the first and second end hosts to communicatively connect the first and second end hosts at layer-2.

21. The computer program product according to claim 14, wherein said computer readable program code is configured to interconnect the first and second end hosts at layer-2.

22. The computer program product according to claim 15, wherein said computer readable program code is further configured to interconnect the first and second virtual hypervisors via employing at least one member taken from the group consisting of: software switches; a data center network emulated through network namespaces and virtual ethernet pairs.

23. The computer program product according to claim 14, wherein said computer readable program code is configured to migrate the virtual machine from one virtual hypervisor to another virtual hypervisor within one of the first or second end hosts.

24. The computer program product according to claim 14, wherein said computer readable program code is configured to migrate the virtual machine from one virtual hypervisor to another virtual hypervisor from the first end host to the second end host.

25. The apparatus according to claim 14, wherein one of the first and second end hosts comprises a virtual machine which runs a shared network file system service for storing virtual machine images with respect to both of the first and second end hosts.

* * * * *